US010886546B2

(12) United States Patent
Hierl et al.

(10) Patent No.: US 10,886,546 B2
(45) Date of Patent: Jan. 5, 2021

(54) DYNAMIC PURGE CHAMBER

(71) Applicant: HPS HOME POWER SOLUTIONS GMBH, Berlin (DE)

(72) Inventors: Andreas Hierl, Berlin (DE); Dirk Radue, Berlin (DE); Gunnar Schneider, Wildau (DE); Uwe Benz, Uhldingen (DE); Kevin Schroder, Berlin (DE); Zeyad Abul-Ella, Berlin (DE)

(73) Assignee: HPS HOME POWER SOLUTIONS GMBH

(*) Notice: Subject to any disclaimer, the term of this patent is extended or adjusted under 35 U.S.C. 154(b) by 252 days.

(21) Appl. No.: 15/777,979

(22) PCT Filed: Nov. 24, 2016

(86) PCT No.: PCT/EP2016/078687
§ 371 (c)(1),
(2) Date: Sep. 5, 2018

(87) PCT Pub. No.: WO2017/089466
PCT Pub. Date: Jun. 1, 2017

(65) Prior Publication Data
US 2019/0036135 A1 Jan. 31, 2019

(30) Foreign Application Priority Data
Nov. 25, 2015 (DE) .................. 10 2015 120 456

(51) Int. Cl.
*H01M 8/0662* (2016.01)
*H01M 8/04223* (2016.01)
(Continued)

(52) U.S. Cl.
CPC .......... *H01M 8/04231* (2013.01); *C25B 1/04* (2013.01); *C25B 15/08* (2013.01);
(Continued)

(58) Field of Classification Search
None
See application file for complete search history.

(56) References Cited

U.S. PATENT DOCUMENTS

2002/0094469 A1* 7/2002 Yoshizumi ........ H01M 8/04089
429/411
2005/0214617 A1 9/2005 Chapman et al.
(Continued)

FOREIGN PATENT DOCUMENTS

DE 10 2014 103724 A1 9/2015
JP 2001130901 A 5/2001
(Continued)

OTHER PUBLICATIONS

Machine translation of WO 2012/113932 (Year: 2012).*
EP Office Action dated May 29, 2019 issued by the EPO in corresponding EP Application No. 16801220.1, 5 pages.

*Primary Examiner* — Wyatt P McConnell
(74) *Attorney, Agent, or Firm* — Ware, Fressola, Maguire & Barber LLP

(57) ABSTRACT

The invention relates to a flushing arrangement for flushing (purging) a fuel cell unit on its anode side and/or an electrolysis unit on its cathode side. The flushing arrangement has a flushing channel with a first and a second flushing channel section, which can be fluidically connected to one another via a purge valve of the flushing arrangement, and with a buffer store which is fluidically connected to the flushing channel and downstream of the purge valve, and which has a storage chamber that is provided for intermediate storage of a fluid mass to be flushed in a pulse-type manner with a flush mass flow from the fuel cell unit and/or from the electrolysis unit, so that this fluid mass can be discharged with a discharge mass flow, which is smaller than the flush mass flow, out of an outflow element fluidically connected to the second flushing channel section.

20 Claims, 6 Drawing Sheets

(51) Int. Cl.
 *C25B 1/04* (2006.01)
 *C25B 15/08* (2006.01)
 *H01M 8/04119* (2016.01)

(52) U.S. Cl.
 CPC ... *H01M 8/04156* (2013.01); *H01M 8/04164* (2013.01); *H01M 8/0662* (2013.01); *H01M 2250/10* (2013.01); *Y02E 60/36* (2013.01)

(56) References Cited

U.S. PATENT DOCUMENTS

2006/0105224 A1    5/2006   Schwarz et al.
2006/0263658 A1   11/2006   Yanagi et al.
2013/0149627 A1    6/2013   Nishimura et al.

FOREIGN PATENT DOCUMENTS

WO         2012/113932 A2    8/2012
WO    WO2012/113932    *    8/2012

* cited by examiner

DYNAMIC PURGE CHAMBER

CROSS REFERENCE TO RELATED APPLICATIONS

This application is the U.S. National Stage of International Application Number PCT/EP2016/078687 filed on Nov. 24, 2016, which application claims priority under 35 USC § 119 to German Patent Application No. 10 2015 120 456.8 filed on Nov. 25, 2015. Both applications are hereby incorporated by reference in their entirety.

TECHNICAL FIELD

The present invention relates to a flushing arrangement for flushing (purging) a fuel cell unit on its anode side and/or an electrolysis unit on its cathode side. The present invention also relates to a domestic power plant as well as to a method for operating a domestic power plant.

BACKGROUND OF THE INVENTION

Arrangements for flushing a fuel cell unit on its anode side and/or an electrolysis unit on its cathode side are generally known from prior art. Flushing is necessary in order to expel foreign gas parts as well as liquid water accumulating locally in the cell structures, which may have a negative impact on the performance and service life of the fuel cell and/or the electrolyzer, at regular intervals or in dependence on the operating conditions.

SUMMARY OF THE INVENTION

It is the object of the present invention to specify a flushing arrangement which is improved with regard to $H_2$ safety, operating behavior and realization of the relevant substance flows, a domestic power plant with a flushing arrangement as well as a method for operating a domestic power plant.

With regard to the flushing arrangement, the object is achieved by means of a flushing arrangement for flushing (purging) a fuel cell unit on its anode side and/or an electrolysis unit on its cathode side, wherein the flushing arrangement has a flushing channel, with a first and a second flushing channel section, which can be fluidically connected to one another via a purge valve of the flushing arrangement, and with a buffer store which is fluidically connected to the flushing channel, and downstream of the purge valve, and which has a storage chamber that is provided for intermediate storage of a fluid mass to be flushed in a pulse-type manner with a flush mass flow from the fuel cell unit and/or the electrolysis unit, so that this fluid mass can be discharged with a discharge mass flow, which is smaller than the flush mass flow, out of an outflow element fluidically connected to the second flushing channel section. The discharge mass flow, most of which typically consists of $H_2$, may be mixed into an air mass flow so that the created gas mixture has an $H_2$ concentration which, in all operating conditions, is clearly below the lower flammability limit of $H_2$ in air. This dilution effect allows for a safe operation of the installation.

The outflow element may be realized as a cover plate, choke, nozzle, jet pump, venturi nozzle or recombiner. The buffer store may branch off from the second flushing channel section. The second flushing channel section may run at least partially through the buffer store.

The invention incorporates the finding that during purging pursuant to prior art, which is performed in a pulse-type manner with a flush mass flow, relatively large amounts of hydrogen are typically flushed from a fuel cell unit and/or an electrolysis unit within fractions of a second. Subsequent to such pulse-type purging, no hydrogen is released for a longer period of time. Thus, critically high hydrogen concentrations, in particular also concentrations above the lower flammability limit, might occur locally and temporarily during mixing with the waste air, which might lead to a dangerous oxyhydrogen reaction. Therefore, the waste air mass flow must be increased at least during the pulse with a large flush mass flow, in order to ensure a sufficient dilution effect.

Due to the fact that, pursuant to the invention, a buffer store with a storage chamber is arranged downstream of the purge valve, the fluid mess removed in a pulse-type manner with the flush mass flow can be removed with a discharge mass flow which is smaller than the flush mass flow. Preferably this leads to a flattening of the pulse-type flush mass flow, which advantageously leads to a prevention of critical hydrogen concentrations at a simultaneously small waste air mass flow.

In a preferred embodiment the storage chamber is expandable. The storage chamber may be able to be expanded by the fluid mass to be flushed from the fuel cell unit and/or the electrolysis unit with the flush mass flow in a pulse-type manner. It is particularly preferred that the storage chamber is designed as bellows, which are able to receive a respective flush volume, i.e. the flush mass flow multiplied by a pulse duration of a purge, without or with only a slight build-up of counterpressure. A storage chamber designed as bellows may be configured to be returned into its unexpanded state by means of a gravitational force, in particular exclusively by a gravitational force of a preferably freely movable end plate of the bellows. For a targeted adjustment of the force which returns the bellows into their unexpanded state and, therefore, of the discharge time and the pressure development of the bellows buffer over time, the gravitational force may also be increased or partially compensated by means of an installed spring device.

In order to exclude increased loss of performance and aging effects, it is advantageous to respectively flush approx. 0.75 (Nl) (normal liters) of gas rich in $H_2$ per kW nominal power of the fuel cell unit per flushing process from the anode side. Preferably, a pulse-type flush process lasts less than 0.5 s, preferably a maximum of 0.2 s. It is also advantageous to flush respectively approx. 0.75 Nl (normal liters) of gas rich in $H_2$ per kW nominal power of the electrolysis unit.

Unless otherwise specified, it shall be assumed in the following that a dimensioning of the flushing distance with regard to the fuel cell unit requirements is also sufficient for the electrolysis unit. However, in case of significantly changed performance parameters and operating conditions in the overall system, the dimensioning may also be performed analogously based on specific electrolysis unit flushing requirements.

In case of a fuel cell unit which, on the air side, operates at ambient pressure, the pressure on the anode side and, therefore, the pre-existing pressure for a flushing process, is typically 300 millibar.

In case of a usually fixed anode pressure, the flush mass flow and the flush volume for the fuel cell unit may be able to be adjusted on the side of the flushing arrangement via the flow resistance of the fuel cell purge valve (for example an electromagnetic valve) and/or the open time during the pulse.

The flush mass flow and the flush volume for the electrolysis unit may be adjustable via the selection of the cathode pressure at which the flushing process is started, the flow resistance of the electrolysis purge valve (for example an electromagnetic valve) and/or the open time during the pulse.

The ratio between waste air mass flow and discharge mass flow as well as the efficiency of the mixing of both mass flows determine the concentration of flammable gases, in particular $H_2$, in the output air. For safety reasons, said concentration is to be clearly below the lower flammability limit of $H_2$ in air (the lower flammability limit of $H_2$ in air is at 4%), preferably below approx. 2%. In case of a fixed exhaust mass flow, this may become a limiting factor for the still allowed maximum discharge mass flow and the entire flushing arrangement must be dimensioned accordingly.

The charging/discharging behavior, in particular the development of the discharge mass flow over time, can be defined via the parameters of the cross-section surface of the bellows, the length-to-diameter ratio of the bellows, spring stiffness of the bellows material, weight of the freely movable end plate, and, in particular, via the design of the flow resistance of the outflow element. The design data of the bellows and the outflow element described below may apply to a flushing arrangement for a fuel cell unit with a nominal power of 1 kW.

It is particularly preferably that a flow-through coefficient of the outflow element is higher than or equal to the one of the purge valve.

Preferably, the cross-section surface of the bellows is 100 to 150 cm$^2$. It is particularly preferred that the length-to-diameter ratio of an active volume of the bellows at maximum deflection is 1.5:1 to 1:1. The spring stiffness of the bellows is preferably between 50 and 100 N/m. The material of the elastic part of the bellows may preferably consist of a chemically stable and permanently elastic elastomer or of a metal that does not become brittle through the contact with hydrogen.

The outflow element has preferably a flow-through coefficient that is essentially equal to the one of the purge valve. This may for example be achieved by means of a cover plate with a free diameter of approx. 1 mm. The weight of the freely movable end plate is preferably between 0.3 and 0.5 kg. Preferably, a storage chamber realized as bellows has a volume of less than 3 L, preferably less than 2.6 L in its expanded state.

Preferably, the bellows are designed such that the excess pressure in the bellows compared to the surrounding environment during operation is no more than the anode nominal pressure, for example 300 millibar. It is particularly preferred that the bellows are designed such that the excess pressure is less than 100 millibar at maximum deflection and/or no more than 20 millibar during nominal operation, i.e. up to approx. 50 percent of the bellows' maximum deflection.

For safety reasons, the dead volume of a storage chamber designed as bellows is preferably minimal. It is particularly preferred that the dead volume of a storage chamber designed as bellows is smaller than 250 ml.

The storage chamber may be realized as a bladder accumulator or as a piston accumulator (cf. FIG. 5). Alternatively to an expendable design of the storage chamber, the storage chamber may be designed as a rigid pressure container where the storage chamber is designed such that the fluid mass flushed in a pulse-type manner with the flush mass flow from the fuel cell unit and/or the electrolysis unit leads to a pressure increase in the storage chamber.

In a preferred embodiment, the buffer store has an outlet choke as an outflow element, which may be designed as a cover plate. The outlet choke may be dimensioned such that, for example, a storage chamber realized as bellows with a volume of 2.6 L in its expanded state is discharged within less than 30 seconds.

The outflow element may preferably be a sintered metal cylinder or a sintered ceramic cylinder or a nonwoven metal fabric, via which the discharge mass flow is distributed evenly into the waste air. This improves the mixing of the outflowing gas containing hydrogen with the waste air which is diluting the hydrogen concentration. The advantageous loss of nominal pressure via this device may be dimensioned analogously to the above described outlet choke.

The outflow element may preferably be or comprise a catalytically active recombiner. Preferably a hydrogen-containing discharge mass flow with a large amount of excess air is fed into said recombiner in the presence of an oxidation catalyst, preferably catalysts containing noble metal of the platinum group, so that the recombination of the hydrogen with the air oxygen at approx. 0.5% to 8% hydrogen in the air, preferably at 1% to 5% hydrogen in the air, leading to water with heat being released takes place in a controlled and flame-free manner.

It has proven to be advantageous if the recombiner is assigned a compressor for supplying the recombiner with air, the activation of which is time-coupled with the activation of the purge valve. Alternatively, or in addition, the activation of the compressor may also be coupled to the time of the start-up and/or wind-down of a ventilation device of a domestic power plant. Alternatively, or in addition, the activation of the compressor may be [coupled to] the outlet temperature of the discharge mass flow and/or of a waste air/output air flow caused by a ventilation device of a domestic power plant.

It is the advantage of the invention that, due to the equalization of the discharge mass flow by the buffer store, the occurring concentrations are easy to adjust, which makes the recombination safely controllable with little regulating effort in the first place. Thus, the chemical energy of the hydrogen contained in the discharge mass flow is able to be thermally used in the process and the waste air of the system is not burdened with hydrogen from the flushing process.

It has proven to be advantageous if the outflow element is designed for a mass flow of less than 2.5 Nl/min per kW fuel cell nominal power, preferably no more than 2.0 Nl/min per kW fuel cell nominal power, respectively during normal operation (error-free operation of the buffer store).

The flushing arrangement may be designed to reduce a flush volume flow to a discharge volume flow of less than 10%, preferably less than 3%, of the flush volume flow. Preferably, a removal of the discharge volume flow into the surrounding environment takes place via a at least 50 Nm$^3$/h large waste air/output air flow. Preferably, a nominal operating pressure of the storage chamber is less than 50 millibar, preferably less than 20 millibar, above an operating pressure of the waste air flow/output air flow.

During the flushing process, water which is intended to be liquid, can be removed as well. In a preferred embodiment, the water is first of all separated from the gas flow and subsequently preferably returned into the process of the fuel cell and/or of the electrolysis. It is advantageous if the water separation is realized in the buffer container, since, there, the flow speeds of the carrier gas are advantageously small for a separation of the liquid via gravitational forces.

Preferably, the buffer container has at least one input and/or one output, respectively, for the flushing gas. Liquid which enters the buffer container together with the hydrogen-containing flushing gas via the inlet with high flow speed may be separated there from the gas flow preferably gravimetrically or/and through flow guiding and/or drop separating installations and/or, in case of a respective tangential feed-in, through centrifugal forces or by means of other common methods pursuant to prior art. Preferably, the liquid may be collected at the bottom of the buffer store and be discharged in its entirety via the liquid outlet and preferably be fed back into the process.

The flushing arrangement may be connected to a gas-liquid separator, preferably to an oxygen separator present in the electrolysis unit, or to a water refill container also present therein and/or a compensation tank and/or comprise such a gas-liquid separator.

The gas-liquid separator and/or compensation tank may be arranged in a side channel branching off from the second flushing section. Preferably, a compensation tank is arranged downstream of the gas-liquid separator. It has proven to be advantageous if the side channel has a syphon-like design. A side channel with a syphon-like design may serve as overpressure protection for the buffer store, the water column of which might push into the gas-liquid separator when the excess pressure of the hydrogen is too high. The hydrogen which, in that case, flows out via the side channel leads to a pressure relief of the buffer store. In a preferred embodiment, a gas-liquid separator may also be integrated into the side channel with a syphon-like design. Such a design of the flushing arrangement also makes it possible to feed the water from the flushing process back into the electrolysis module for use.

The flushing arrangement may have a fill height sensor, in particular a fill height sensor assigned to the buffer store. Preferably, the fill height sensor may be designed and arranged to detect an expansion state of the storage chamber. The fill height sensor may preferably be realized as an optical sensor or a magnetic sensor or as an ultrasonic sensor and is preferably allowed for operation in a potentially hydrogen-containing environment. Preferably, the fill height sensor is arranged and adjusted so that it triggers a safety chain and prevents further leaking of hydrogen in case of an expansion status of preferably no more than 80% of the maximum volume, which may occur in case of a defective magnetic valve that no longer closes. In a preferred method, the quality of the flushing process may also be monitored via the fill height sensor and/or the flushing process may be transitioned from a controlled process into a regulated process via the detection of the actual flushed volume.

In another preferred embodiment the flushing arrangement may comprise one or several other buffer stores each comprising an expandable storage chamber. At least two of the storage chambers may be fluidically connected with regard to the flow-through of the flush mass flow such that parallel or serial flowing through the storage chambers is realized. The advantage of this arrangement is that different parameters can be adjusted through this design, which allow, e.g. for a two-step, improved water separation which can, in particular, be realized in case of the serial fluid connection and/or a redundancy or reserve and/or a detection of errors, for example by monitoring the response of the other (redundant) buffer store. In case of two- or multi-step buffering, the buffer stores may, for example, be individually connected and disconnected via a magnetic valve, or the buffer stores may respond only at different pressures due to different designs.

With regard to the domestic power plant, the object is achieved by means of a domestic power plant with at least one fuel cell unit and/or electrolysis unit, wherein the domestic power plant comprises an above described flushing arrangement which is connected for flushing the fuel cell unit on its anode side and/or the electrolysis unit on its cathode side.

In a preferred embodiment of the domestic power plant, the latter comprises a living space ventilation system. The living space ventilation system may comprise a supply air channel, via which supply air can be fed into the living space ventilation system. The living space ventilation system may comprise a room supply air channel via which air can be fed by the living space ventilation system into a living space, for example a living room. The living space ventilation system may comprise a waste air channel, via which waste air can be released by the living space ventilation system into the surrounding environment. Preferably the outflow element of the flushing arrangement is arranged such that the fluid mass exiting the outflow element can be expelled into the surrounding environment via the waste air channel.

Alternatively, fluid mass exiting via the outflow element can also be mixed into the cathode air of the fuel cell unit. The hydrogen portion is then, while it is flowing through the cathode, for the most part catalytically converted with oxygen at the catalyst arranged there. In this process, water vapor and heat, which increases the air temperature and is available for heating the room air, are generated.

Preferably, the domestic power plant is designed and/or may be operated such that a nominal operating pressure of the storage chamber is less than 50 millibar, preferably less than 20 millibar, furthermore preferably less than 10 millibar, above an operating pressure of the waste air flow guided through the waste air channel. The anode side of the fuel cell unit is preferably designed for an operating pressure of no more than 300 millibar.

The domestic power plant with the flushing arrangement may be further designed pursuant to the above described flushing arrangement.

With regard to the operation of a domestic power plant, the object is achieved by means of a method comprising the following step: Expelling the fluid mass together with waste air via the waste air channel into the surrounding environment. Preferably, the method pursuant to the invention is executed by an above described domestic power plant. Another preferred arrangement requires that, with regard to its size and configuration, the flushing arrangement is designed such that it may be used jointly for the fuel cell unit and the electrolysis unit if both components are simultaneously present in the system. While, typically, the fuel cell unit and the electrolysis are usually not operated simultaneously and the requirements that the two components place on the flushing arrangement are usually different, said requirements may be fulfilled in a targeted manner by means of the adjustment of the presently described parameters.

It has proven to be advantageous if the fluid mass is expelled with a discharge mass flow of no more than 2.5 Nl/min per kW fuel cell nominal power and if the waste air is removed with a volume flow of at least 100 m$^3$/h. The method may require purging in intervals, wherein preferably a maximum of 0.8 Nl per kW fuel cell unit nominal power exits the fuel cell unit and/or an electrolysis unit per purge as fluid mass with a flush mass flow. Preferably a flushing break of at least 20 seconds, preferably a flushing break of more than 30 seconds, takes place between the intervals.

Preferably, the method requires that a maximum of 0.8 Nl per kW fuel cell nominal power is received in the buffer store per purge and removed via the outflow element with a mass flow of approximately 2 Nl/min per kW fuel cell nominal power.

BRIEF DESCRIPTION OF THE DRAWINGS

In the following, the exemplary embodiments of the present invention are explained by way of example with references to the attached figures. The following is shown in FIG. 1: a schematic illustration of a first exemplary embodiment of a domestic power plant with a flushing arrangement.

DETAILED DESCRIPTION

Figure 1:
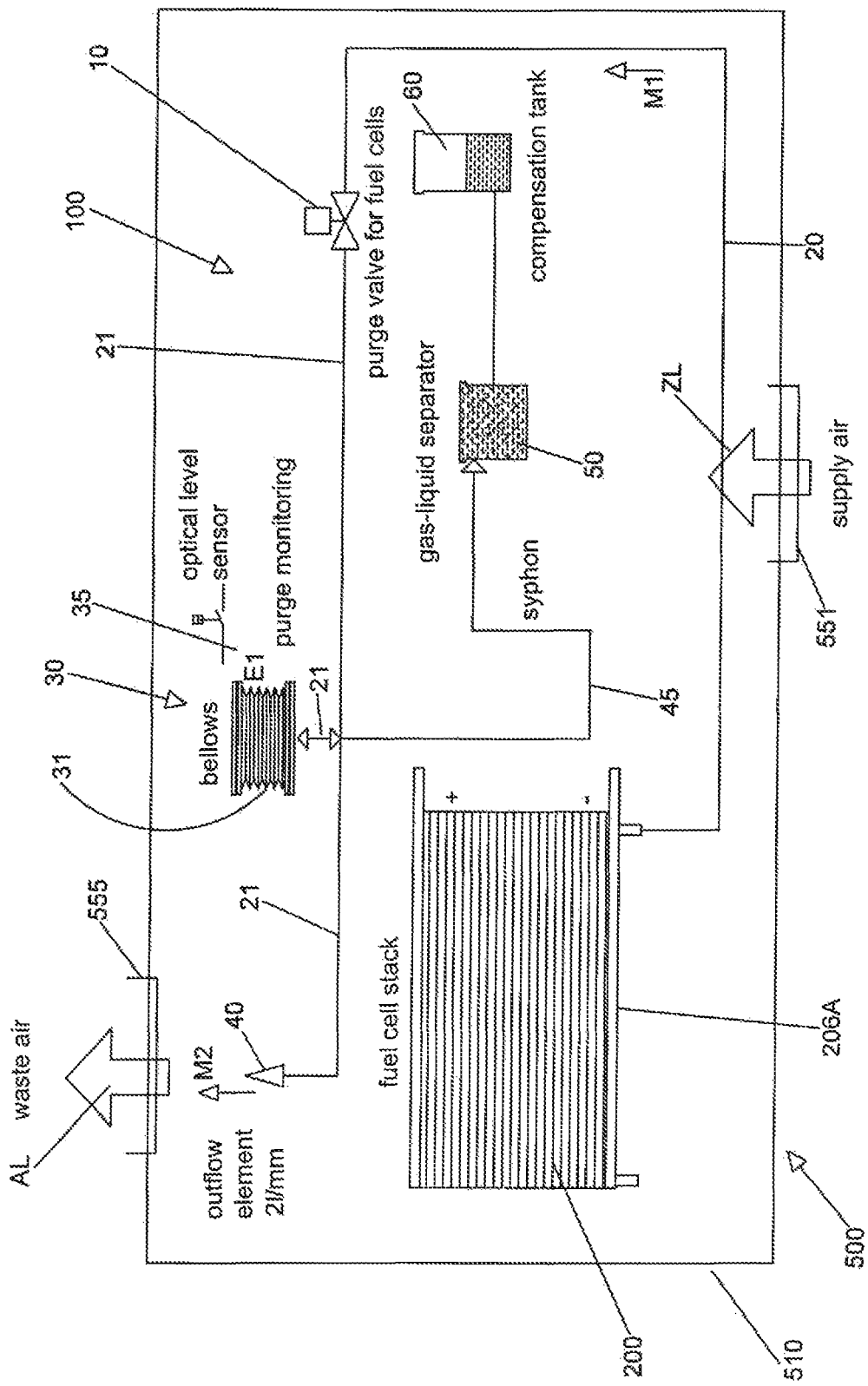

A domestic power plant 500 in FIG. 1 comprises a fuel cell unit 200. The domestic power plant 500 may have a living space ventilation system, of which only a supply air channel 551 and a waste air channel 555 are shown in the present example. Furthermore, the domestic power plant 500 has a flushing arrangement 100 for flushing the fuel cell unit 200 on its anode side 200A.

The flushing arrangement 100 comprises a flushing channel, which, in the present example, is formed by a first flushing channel section 20 and a second flushing channel section 21. The first 20 and second 21 flushing channel sections may be fluidically connected to one another via a purge valve 10 of the flushing arrangement 100. The first flushing channel section 20 is, on the one side, fluidically connected to the anode side 200A of the fuel cell unit 200, which, in this example, has a fuel cell nominal power of 1 kW, and, on the other side, to the purge valve 10. A buffer store 30 with a storage chamber 31 is arranged downstream of the purge valve 10 and, via the second flushing channel section 21, fluidically connected to the purge valve 10. The buffer store 30 branches off from the second flushing channel section 21.

In the present example, the storage chamber 31 is designed as bellows. The storage chamber 31 designed as bellows serves the intermediate storage of a fluid mass to be flushed in a pulse-type manner with a flush mass flow M1 from the fuel cell unit 200. If the purge valve 10 is open, the flush-type fluid mass flushed with the flush mass flow M2 of, for example, 100 Nl/min over a period of approx. 500 milliseconds may enter the storage chamber 31 designed as bellows, through which the latter expands. In its expanded state E1, the storage chamber 31 designed as bellows has a volume of 2.6 L.

Furthermore, the flushing arrangement 100 comprises an outflow element 40 which is fluidically connected to the second flushing channel section 21. The outflow element 40 is designed for a discharge mass flow M2 of no more than 2.5 Nl/min during normal operation and serves the removal of the fluid mass with a discharge mass flow M2, the amount of which is significantly lower than the flush mass flow M1.

A side channel 45 with a syphon-like design branches off from the second flushing channel section 21. A gas-liquid separator 50 and a compensation tank 60 are arranged in the side channel 45.

A fill height sensor 35, which, in the present example, is designed and arranged to detect an expansion state of the storage chamber 31, is assigned to the buffer store 30. In the present case, the storage chamber is shown in a less than 50% expanded state so that the fill height sensor 35, which, in the present example, is designed as an optical light barrier, is not triggered.

Via the supply air channel 551, supply air ZL can enter into a housing section 510 of the domestic power plant 500, wherein, in the present example, the flushing arrangement 100 and the fuel cell unit 200 are arranged within the housing section 510 of the domestic power plant 500. Via the waste air channel 555, waste air AL from the living space ventilation system (not shown) can be expelled into the surrounding environment. The outflow element 40 of the flushing arrangement 100 is arranged such that the fluid mass exiting the outflow element 40 can be expelled into the surrounding environment via the waste air channel 555.

Figure 2:
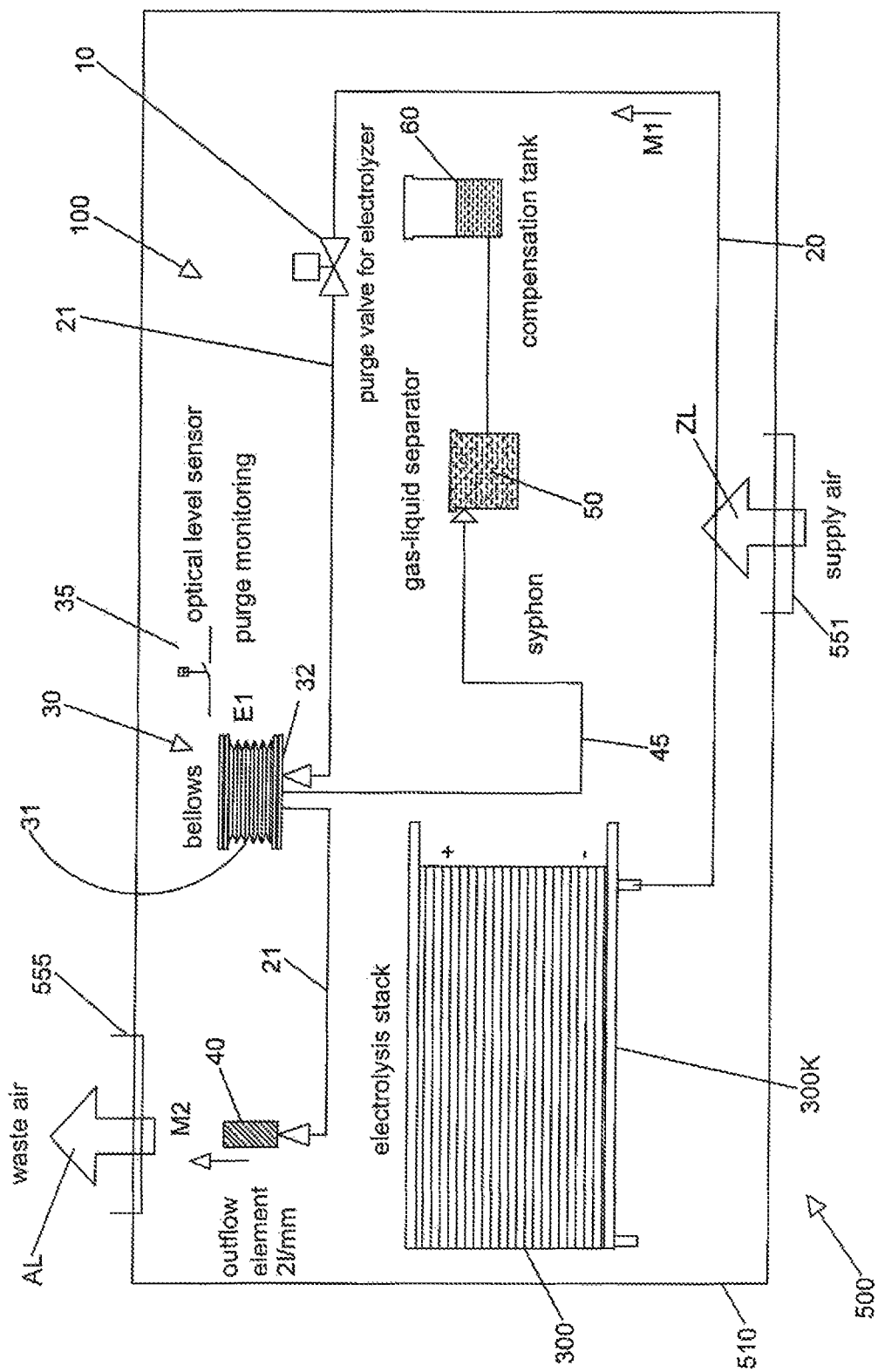
FIG. 2 a schematic illustration of a second exemplary embodiment of a domestic power plant with a flushing arrangement.

A domestic power plant 500 in FIG. 2 comprises an electrolysis unit 300 with a connected flushing arrangement 100. Furthermore, FIG. 2 shows a supply air channel 551 of a not shown living space ventilation system which enters the housing section 510 of the domestic power plant 500. Furthermore, the waste air channel 555 of a—not shown—living space ventilation system is visible, from which waste air AL from the housing section 510, which is assigned to the electrolysis unit 300, can exit the domestic power plant 500.

The domestic power plant 500 in FIG. 2 comprises a flushing arrangement 100 for flushing the electrolysis unit 300 on its cathode side 300K. The flushing arrangement 100 comprises a first 20 and a second 21 flushing channel section which may be fluidically connected to one another via a purge valve 10 of the flushing arrangement 100. The flushing arrangement 100 also comprises a buffer store 30 arranged downstream of the purge valve 10 with a storage chamber 31, which, in the present example, is designed as bellows and is provided for the intermediate storage of a fluid mass to be flushed in a pulse-type manner with a flush mass flow M1 from the electrolysis unit 300. The second flushing channel section 21 runs at least partially through the buffer store 30.

This fluid mass can be removed with a discharge mass flow M2, which is smaller than the flush mass flow M1, via an outflow element 40 which is fluidically connected to the second flushing channel section 21.

In the present example, the outflow element 40 of the flushing arrangement 100 is arranged such that the fluid mass exiting the outflow element 40 can be expelled into the surrounding environment via the waste air channel 555.

The storage chamber 31 comprises a water separator 32 arranged on the inside so that separated water of a domestic power plant can be returned for further use. In the present example, this is achieved via the side channel 45.

Figure 3:
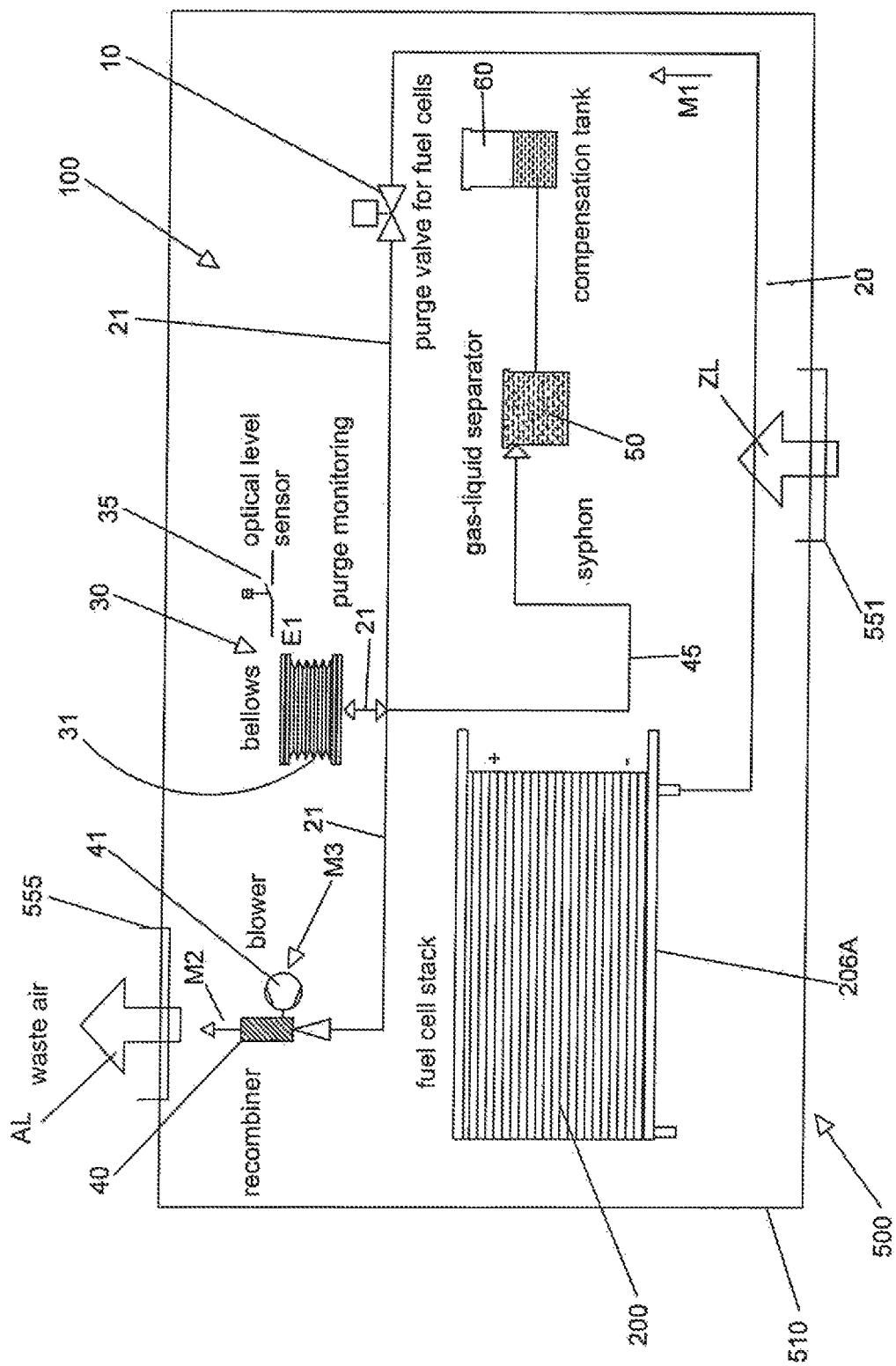
FIG. 3 a schematic illustration of a third exemplary embodiment of a domestic power plant with a recombiner as outflow element.

FIG. 3 shows the arrangement of FIG. 1, in which the outflow element 40 is provided as a recombiner. The discharge mass flow M2 and, via a separate ventilator 41, an airflow M3 flow into the outflow element 40 provided as a recombiner. Inside the recombiner, the two airflows are mixed and the hydrogen contained in the discharge mass flow is catalytically converted into water and heat with the oxygen from the airflow M3. The heated product gas, which is now free of hydrogen, is mixed into the waste air AL.

Figure 4:
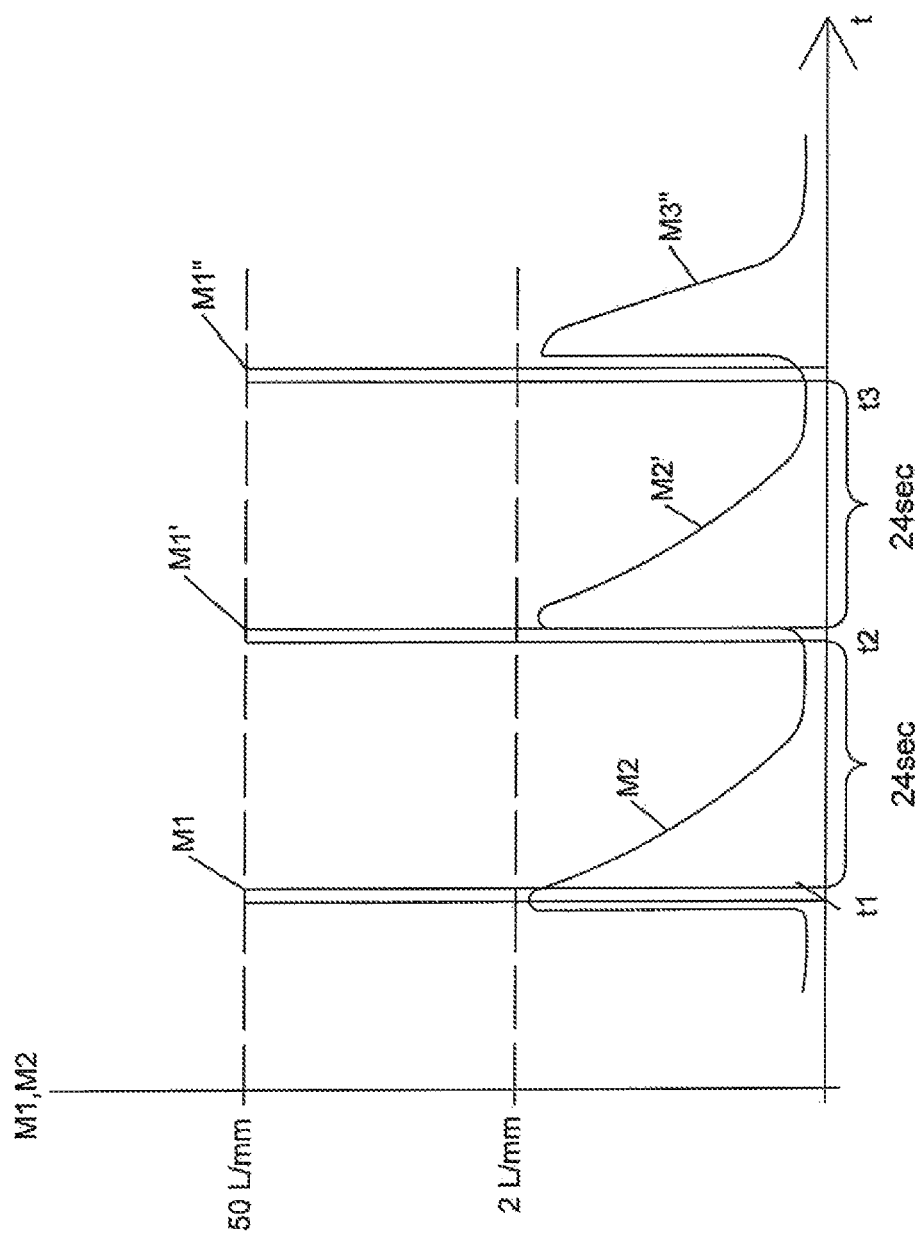
FIG. 4 a schematic illustration of the development of the flush mass flow and the discharge mass flow over time.

FIG. 4 serves the purpose of explaining the function of the flushing arrangement pursuant to the invention based on a diagram showing the development of the mass flow over time.

A—not shown—fuel cell unit is respectively flushed with a pulse-type flush mass flow M1, M1' and M1" at the points in time T1, T2 and T3. A break of respectively 24 sec. takes place between the individual purges. As can be inferred from FIG. 4, the flush mass flows M1, M', M1" flushed out in a pulse-type manner respectively have a flush mass flow of for example, 96 Nl/min, which is for example the case when a purge amounts to no more than 0.8 Nl and is expelled within 500 milliseconds on the anode side of a fuel cell unit. A respective discharge mass flow M2, M2' and M3" is shown in the bottom part of FIG. 4. The flush mass flows respectively have a flush mass flow of below 2 Nl/min. Halfway through an interval between two purges, a flush mass flow M2, M2', M3" reaches for example a mass flow of 0 L/min, i.e. the buffer store is correspondingly discharged and ready for the next flush mass flow to be expelled in a pulse-type manner.

Figure 5:
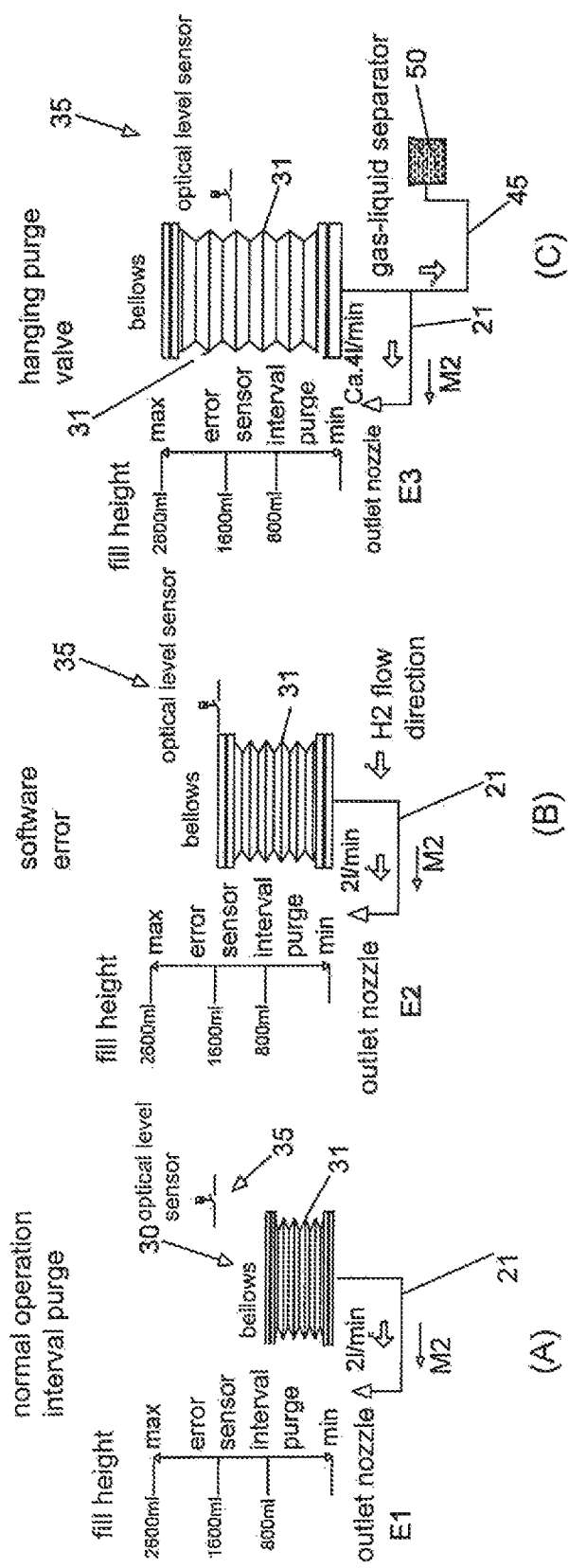
FIG. 5 a schematic illustration of different states of a buffer store.

FIG. 5 shows three expansion states E1, E2, E3 of a storage chamber 31 designed as bellows of a buffer store 30 of a flushing arrangement 100 pursuant to the invention. The figure also shows a fill height sensor 35 assigned to the buffer store 30, presently in the form of a light barrier, for detecting a respective expansion state of the storage chamber 31, in the present example in particular for detecting defects in the storage chamber 31 designed as bellows.

FIG. 5a) shows an expansion state E1 which is shown as it is during an error-free normal operation, directly after the absorption of a pulse with 0.8 Nl released in a pulse-type manner with a flush mass flow, i.e. in a state which is shown at point in time T1, T2 and T3 in FIG. 3. The unexpanded state E0 is indicated in FIG. 5a) by the respectively labeled axis and is reached at a fluid mass of 0 to 0.25 Nl (dead volume) in the storage chamber 31 designed as bellows.

As can be seen in FIG. 5b), the storage chamber 31 designed as bellows is expanded to half its maximum expansion state. This may, for example, occur in case of a software error influencing the purge rate. The fill height sensor 35 detects the expansion state E2 of the storage chamber 31 designed as bellows shown in FIG. 5B, as a result of which no further purges are triggered.

FIG. 5c) shows the error state of a storage chamber 31 designed as bellows which is "hanging" in its maximally expanded expansion state E3. This expansion state E3 is also detected by the fill height sensor 35. Since now the storage chamber 31 designed al bellows is no longer able to serve as an absorption buffer for a purge flushed out in a pulse-type manner, the discharge mass flow M2 increases to an undesired high level of for example 4 Nl/min. In order to make this undesired condition safe, a side channel 45 which comprises a gas-liquid separator 50 branches off from the second flushing channel section 21. Since, in the present example, the side channel 45 has a syphon-like design, it serves as overpressure protection for the storage chamber 31 designed as bellows.

Figure 6:
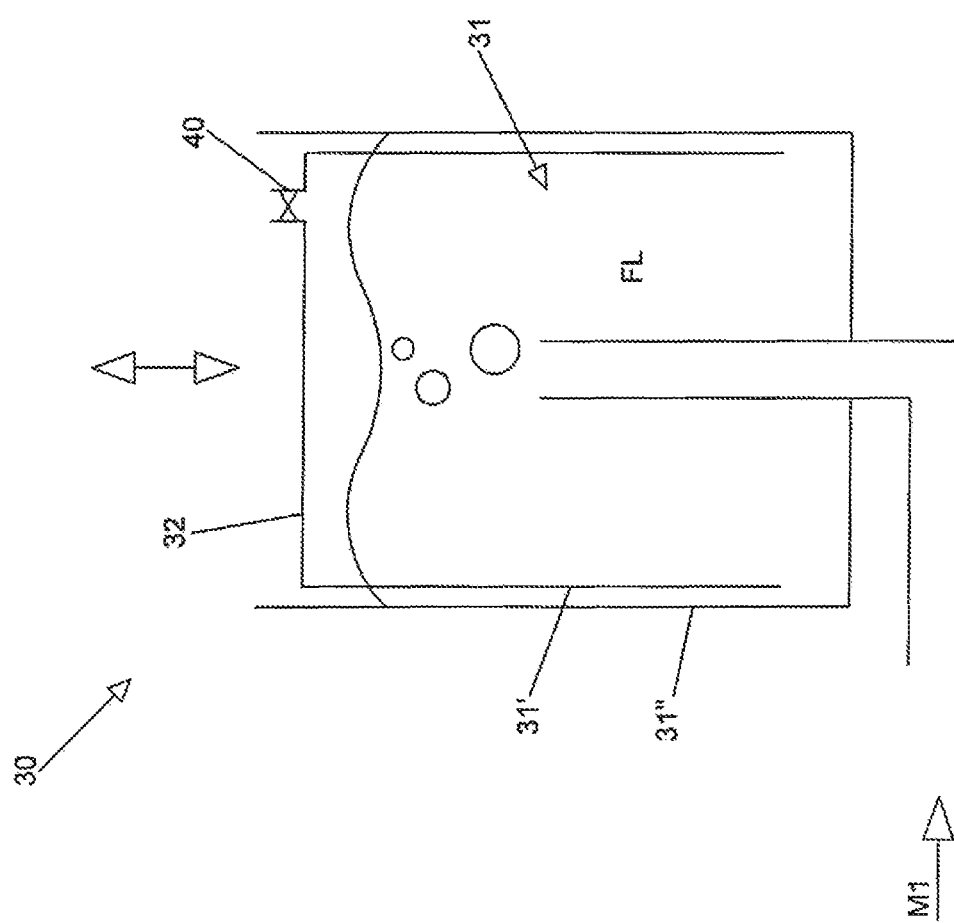
FIG. 6 a schematic illustration of a buffer store with an expandable storage chamber.

FIG. 6 shows a buffer store 30 with expandable storage chamber 31 designed as a piston accumulator. The flush mass flow M1 is guided into the liquid filled storage chamber 31 which, in the shown exemplary embodiment, is limited by concentrically arranged and, against each other, axially movable cylinder elements 31', 31" and, in doing so, replaces the liquid FL. Similar to a piston, the inner cylinder element 31' moves upward and thus realizes an expansion of the storage chamber 31. Just as in the case of bellows (cf. FIG. 5) a defined pressure, which may be discharged again via the outflow element 40 in a desired time interval, can be generated in the flushing gas volume by means of an end plate, in this case, the cover plate 32 of the inner cylinder element 31', as well as optionally by means of a spring arrangement (not shown). In the shown exemplary embodiment of FIG. 6, the function of a gas-liquid separation is also realized.

What is claimed is:

1. A flushing arrangement for flushing (purging) a fuel cell unit on its anode side and an electrolysis unit on its cathode side comprising:
   a flushing channel with a first and a second flushing channel section, which can be fluidically connected to one another via a purge valve of the flushing arrangement, and
   a buffer store which is fluidically connected to the flushing channel and downstream of the purge valve, and which has a storage chamber that is provided for intermediate storage of a fluid mass to be flushed in a pulse-type manner with a flush mass flow from the fuel cell unit and the electrolysis unit, so that this fluid mass can be discharged with a discharge mass flow, which is smaller than the flush mass flow, out of an outflow element fluidically connected to the second flushing channel section.

2. The flushing arrangement according to claim 1, wherein the storage chamber is expandable by the fluid mass to be flushed in a pulse-type manner with the flush mass flow from the fuel cell unit and/or the electrolysis unit.

3. The flushing arrangement according to claim 2, wherein the storage chamber is configured as bellows or a piston accumulator or a bladder accumulator or a rolling diaphragm accumulator.

4. The flushing arrangement according to claim 3, wherein the storage chamber configured as bellows is configured to be moved back into its unexpanded state by gravitational forces.

5. The flushing arrangement according to claim 3, wherein, in its expanded state, the storage chamber configured as bellows has a volume of less than 3 liters.

6. The flushing arrangement according to claim 1, wherein the storage chamber is configured as a rigid pressure container, so the fluid mass to be flushed in a pulse-type manner with the flush mass flow from the fuel cell unit and/or the electrolysis unit leads to a pressure increase in the storage chamber.

7. The flushing arrangement according to claim 1, wherein the storage chamber comprises a water separator arranged on the inside so that separated water of a domestic power plant can be returned for further use.

8. The flushing arrangement according to claim 1, wherein the outflow element is configured for a discharge mass flow of no more than 2.5 Nl/min per kW fuel cell nominal power.

9. The flushing arrangement according to claim 1, wherein a gas-liquid separator and/or a compensation tank, is arranged in a side channel of the flushing arrangement and branches off from the second flushing channel section.

10. The flushing arrangement according to claim 9, wherein the side channel has a syphon design.

11. A flushing arrangement for flushing (purging) a fuel cell unit on its anode side and/or an electrolysis unit on its cathode side comprising:

a flushing channel with a first and a second flushing channel section, which can be fluidically connected to one another via a purge valve of the flushing arrangement, and a buffer store which is fluidically connected to the flushing channel and downstream of the purge valve, and which has a storage chamber that is provided for intermediate storage of a fluid mass to be flushed in a pulse-type manner with a flush mass flow from the fuel cell unit and/or the electrolysis unit, so that this fluid mass can be discharged with a discharge mass flow, which is smaller than the flush mass flow, out of an outflow element fluidically connected to the second flushing channel section, wherein a fill height sensor is assigned to the buffer store, and is configured and arranged to detect an expansion state of the storage chamber.

12. The flushing arrangement according to claim 1, wherein the outflow element is or comprises a catalytically active recombiner.

13. The flushing arrangement according to claim 12, wherein a compressor for supplying the recombiner with air is assigned to the recombiner, wherein the activation of the latter is time-coupled with an activation of the purge valve.

14. The flushing arrangement according to claim 1, wherein a flow-through coefficient of the outflow element is higher than or equal to the flow-through coefficient of the purge valve.

15. A domestic power plant with at least one fuel cell unit and/or electrolysis unit, wherein the domestic power plant has a flushing arrangement according to claim 1 which is connected for flushing the fuel cell unit on its anode side and/or the electrolysis unit on its cathode side.

16. The domestic power plant according to claim 15, having a living space ventilation system with an outside supply air channel via which supply air can be guided into the living space ventilation system, a room supply air channel via which air can be guided into a living space by the living space ventilation system and with a waste air channel via which waste air from the living space ventilation system can be guided to the surrounding environment, wherein the outflow element of the flushing arrangement is arranged such that the fluid mass exiting from the outflow element can be expelled into the surrounding environment via the waste air channel.

17. The domestic power plant according to claim 15, wherein a nominal operating pressure of the storage chamber is less than 50 millibar, preferably less than 20 millibar, further preferably less than 10 millibar, above an operating pressure of the waste air flow guided through the waste air channel (555).

18. The domestic power plant according to claim 15, wherein the anode side of the fuel cell unit is configured for an operating pressure of no more than 300 millibar.

19. A method for operating a domestic power plant according to claim 15, comprising the step of: expelling the fluid mass together with waste air via the waste air channel into the surrounding environment.

20. The method according to claim 19, wherein the fluid mass is expelled with a discharge mass flow of no more than 2.5 Nl/min per kW fuel cell nominal power and/or the waste air is expelled with a volume flow of at least 500 m3/h.

\* \* \* \* \*